Dec. 2, 1941.　　　　N. H. WOLF　　　　2,264,688
TUBE DRAWING MACHINE
Filed Feb. 2, 1940　　　　9 Sheets-Sheet 1

INVENTOR:
Nathan H. Wolf,
BY Paul Paul
ATTORNEYS.

Dec. 2, 1941.    N. H. WOLF    2,264,688
TUBE DRAWING MACHINE
Filed Feb. 2, 1940    9 Sheets-Sheet 5

WITNESSES:
Thomas W. Kerr, Jr.
Woodrow Thomson

INVENTOR:
Nathan H. Wolf,
BY Paul & Paul
ATTORNEYS.

Dec. 2, 1941.     N. H. WOLF     2,264,688
TUBE DRAWING MACHINE
Filed Feb. 2, 1940     9 Sheets-Sheet 8

WITNESSES:

INVENTOR:
Nathan H. Wolf,
BY Paul & Paul
ATTORNEYS.

Dec. 2, 1941.  N. H. WOLF  2,264,688

TUBE DRAWING MACHINE

Filed Feb. 2, 1940  9 Sheets-Sheet 9

WITNESSES:
Thomas W. Kerr, Jr.
Woodrow Stevenson

INVENTOR:
Nathan H. Wolf,
BY Paul & Paul
ATTORNEYS.

Patented Dec. 2, 1941

2,264,688

UNITED STATES PATENT OFFICE 2,264,688

TUBE DRAWING MACHINE

Nathan H. Wolf, Norristown, Pa.

Application February 2, 1940, Serial No. 316,970

9 Claims. (Cl. 205—7)

This invention has reference more particularly, although not exclusively, to machines for cold drawing ductile metal tubular blanks so as to form them into finished seamless tubing of predetermined diameter and wall thickness; the primary object being to provide a machine in which the successive stages of drawing, rolling and stripping are effected in each cyclic operation of said machine.

Another object is the provision of a machine of the type indicated in which the operations of drawing or pushing, rolling and finishing the tube are effected during the forward movement of the mandrel, while said mandrel is stripped from the finished tubing during the return movement.

Still another object of this invention is the provision in a tube drawing machine of the typified character of a mandrel with a novel form of shank adapted to extend through the drawing die, the rolls, finishing die and stripper, thus allowing the drawing tongs to grip said mandrel for the drawing of the tube.

A further object is to so arrange and hold the rolls in definite angular relation to ensure complete and uniform rolling of the tube.

Another object is to provide an improved tube drawing machine equipped with means that positively ensures the finished tube having the desired bore and wall thickness irrespective of its cross-sectional formation.

Still another object is to furnish a tube drawing machine of the above typified species in which the grooves of the respective series of rolls are so shaped as to ensure spreading of the tube, intermediate their points of active contact, and operating pressure, with resultant expansion of the diameter of the tube intermediate the points of contact of the rolls to aid the subsequent stripping of said tube from the mandrel.

A further aim of this invention is to provide a tube drawing machine which is substantially automatic in action, or can be efficiently served by a single operator, as compared with known machines that call for the attention of at least three or more, whereby the overhead cost is proportionately reduced.

Another object is to provide a tube drawing machine equipped with means enabling the operating pressure of the respective rolls to be manually or automatically controlled.

Still further objects, with ancillary advantages of this invention, will more fully appear, as the nature thereof is more fully explained; said invention consisting substantially in certain novel features of construction, the combinations and arrangements of cooperative means for effecting production of seamless drawn tubes in a cyclic operation as hereinafter disclosed, and illustrated by the accompanying nine sheets of drawings of typical embodiments, wherein corresponding reference characters are used to designate similar parts throughout the several views; while the concluding claims more particularly recite the features of novelty.

In the following detailed description of the embodiments of this invention illustrated in the accompanying nine sheets of drawings, specific terms will be employed for the sake of clarity, but it is to be understood that such terms are used in a descriptive sense only and not for purposes of limitation. Each specific term is intended to include all technical equivalents capable of serving in a similar capacity to accomplish an analogous purpose.

Figures 10, 11, 12:
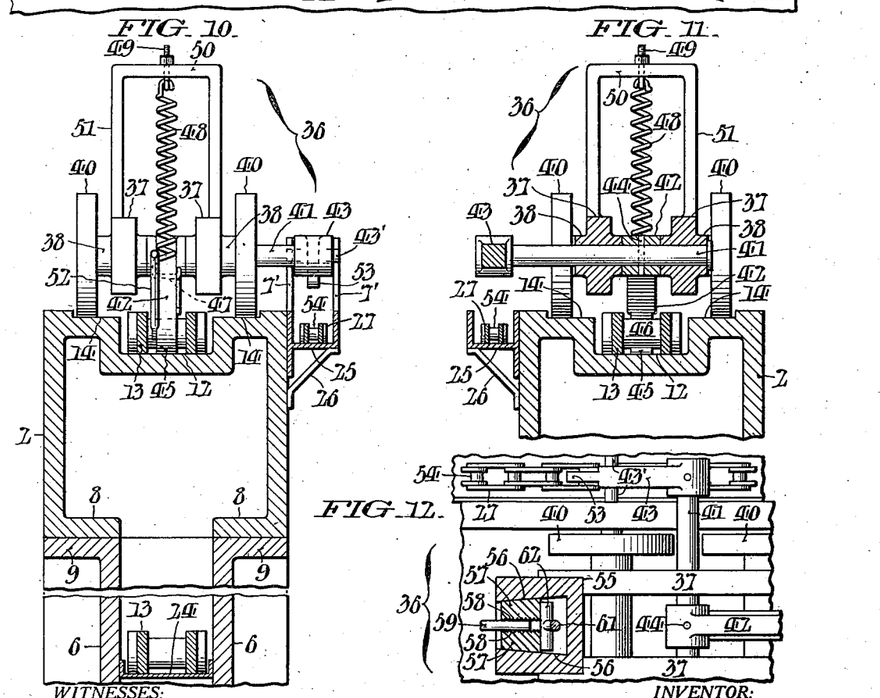
Fig. 10 is a vertical section on the plane X—X of Fig. 9 and looking towards the left-hand thereof.
Fig. 11 is a vertical section on the plane XI—XI of Fig. 9, but looking towards the right-hand of said figure.
Fig. 12 is a plan section, taken approximately as indicated by the arrows XII—XII in Fig. 9.

Referring first to Figs. 1-20, inclusive, the embodiment of this invention therein illustrated comprises a table comprehensively designated by the numeral 1, and including "draw" and "return" benches 2, 3, respectively; said benches being rigidly supported in alignment by end uprights or heads 4, 5 with laterally-spaced intermediate uprights 6, and a centrally located die head structure 7, later on more fully described. The draw-bench 2, as best understood from Fig. 10, is of inverted somewhat channel-section with the side walls inwardly-angled to define supporting members 8 for secure attachment to the top flanges 9 of the intermediate uprights 6, and end heads 4, 5 at 10, as well as to transverse bearers 11 across the die head structure 7. The web or top portion of the draw-bench 2 is longitudinally recessed to provide a track 12, for the active flight of the draw chain 13, with upper flanking recesses or tracks 14 for a purpose later set forth. The draw chain 13 is power driven by means of a sprocket 15 fast on a shaft 16 journaled in a bearing 17 on the end head 4, said shaft being connected to a standard type gear-reducer 18 by means of a flexible coupling 19, while 20 designates a suitable motor for imparting rotation to the sprocket shaft 16 in an obvious manner. The draw chain 13 is also trained over an idler sprocket 21, on a shaft 22 journaled in adjustable bearings 23, in the inner end of the bench 2 proximate the die head structure 7, whereby provision is made for taking-up any "slack" which may develop in said chain; while the return flight of the chain 13 is sustained by a channel section track 24 secured intermediate the head 4, uprights 6 and die head structure 7.

Figure 1:
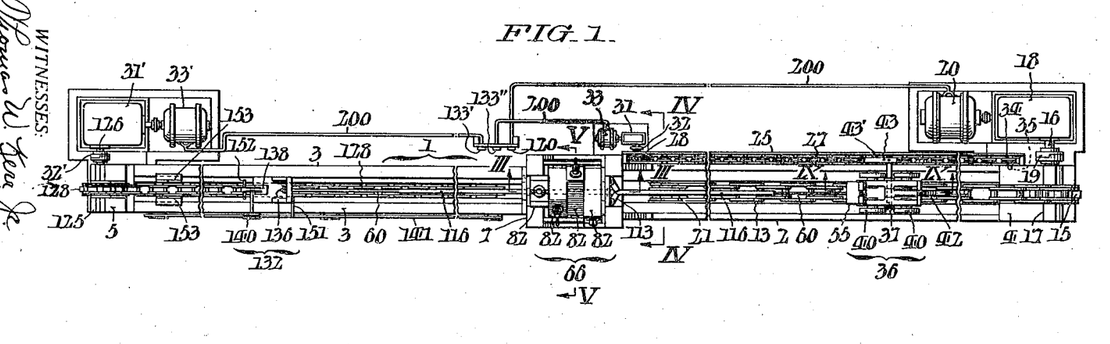
Fig. 1 is a broken plan view of a typical tube drawing machine including the subject-matter of this invention.
Figure 2:
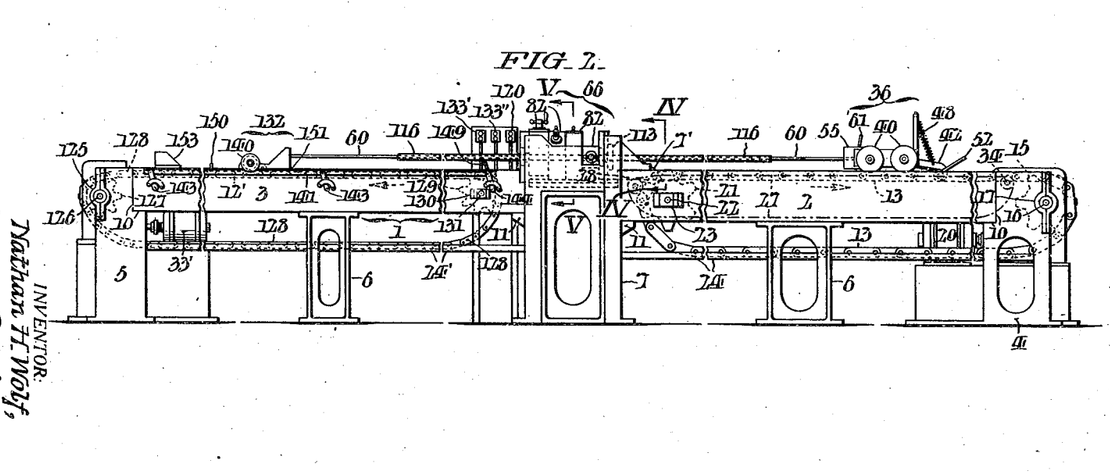
Fig. 2 is a side elevation of the same, or as viewed from below Fig. 1.
Figure 3:
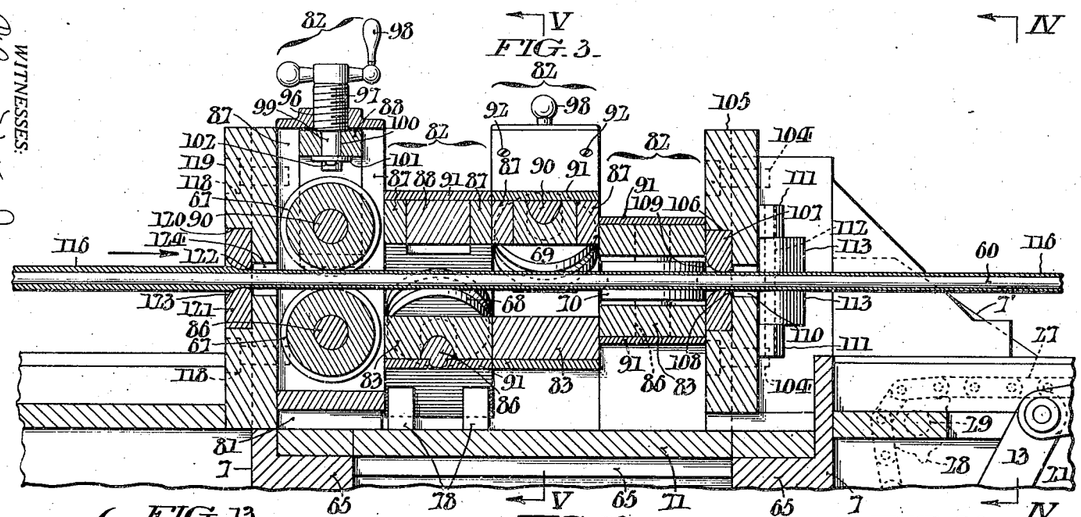
Fig. 3 is a fragmentary longitudinal section, drawn to a larger scale for clearer illustration, taken approximately as indicated by the arrows III—III in Fig. 1.
Figure 4:
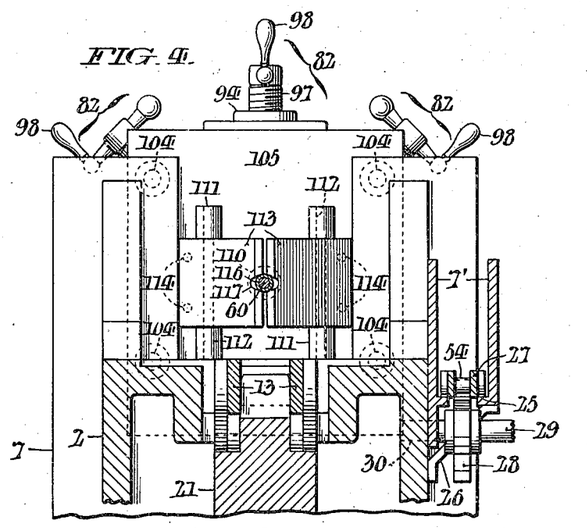
Fig. 4 is a vertical section on the plane IV—IV of Figs. 1, 2 and 3, drawn to a scale corresponding with that of the latter figure.
Figure 5:
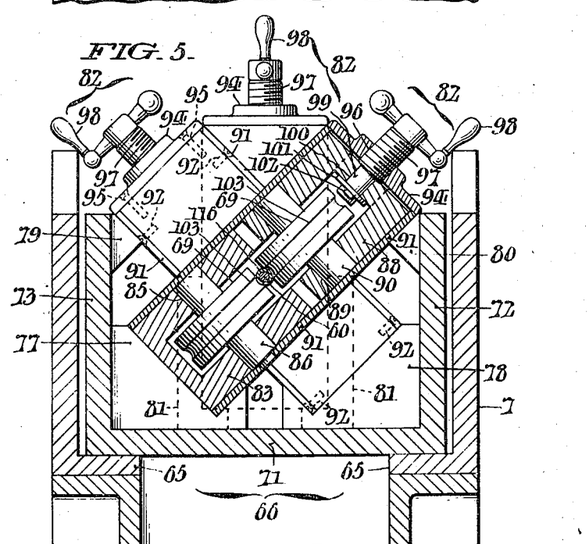
Fig. 5 is a similar section on the plane V—V, also indicated in Figs. 1, 2 and 3.

Preferably mounted along one side of the draw-bench 2 is a suitable track or channel 25, braced at intervals by struts 26, which affords guidance for the active flight of a "return" chain 27, trained about a sprocket 28, fast on a drive shaft 29 journaled in a bearing 30 from the die head structure 7, Figs. 3 and 4, said shaft being connected to a gear reducing mechanism 31, by a flexible coupling 32, driven by a suitable motor 33 operating in a reverse direction to the motor 20 hereinbefore referred to. The return chain 27 is also trained about an idler sprocket 34 on a stub-shaft 35, projecting laterally from the end head 4.

Adapted for progression along the draw-bench upper tracks 14 in one direction by the chain 13 and in the other direction by the chain 27, is the tong device comprehensively designated as 36, see Figs. 1, 2, and 9-12 to better advantage. This tong device 36 comprises a carriage 37 having bearings 38 for the axles 39 of wheels 40 progressible along the draw-bench tracks 14; as well as an oscillatable shaft 41 having reversely-directed angularly-relater dogs 42, 43 secured thereto by pins 44, or other appropriate means. The dog 42 is provided at its free end with a hook 45 for coaction with any one or another of the conventional spacer bushings 46 in the draw chain 13, for a purpose later on clarified. The dog 42 has connected thereto at 47, one end of a spring 48, the remote extremity whereof is anchored, by an eye-bolt 49, to the transverse portion 50 of an inverted stirrup 51, rigid with the adjoining end of the carriage 37; while 52 designates a handle whereby the hook 45 can be manually engaged with or disengaged from the chain 13, if found desirable or necessary. The dog 43 is similarly provided with a hook end 53 for coaction with any one or another of the spacer bushings 54 included in the return chain 27, and it will be clearly apparent, on reference to Fig. 9, that when the dog 42 operatively coacts with the draw chain 13, the dog 43 will be inactive or disposed horizontal as shown by the dotted-line-indication in said figure, in opposition to the spring 48 and vice versa, when the dog 43 operatively engages the return chain 27 the dog 42 will be raised to a horizontal position, as understandable on an examination of the right-hand portion of Fig. 14, under the recoil action of the spring 48. It is also to be noted the dog 43 is provided with a through-pin or stud projection 43' for coaction with an inclined outset 7' from the die-head structure 7 to positively ensure its release from the chain 27 at the termination of the return movement of the tong device 36, see Fig. 14.

The tong device 36 also embodies a hollow head 55 rigid with the carriage 37, said head having opposed tapering walls 56, Fig. 12, and associated gripper jaws 57, preferably made of hardened steel and grooved at 58 to firmly grip the reduced shank 59 of a conventional tube forming mandrel 60. The gripper jaws 57 are a sliding fit in the head 55 and are so tapered in respect to the head walls 56 that as they move outwardly, relative to said head, the parts 58 close-in on the mandrel shank 59 evenly; while a pivotal device consisting of hand lever 61, with a T-head 62 for engagement with the jaws 57, is fulcrumed by a crossarm 63 in suitable bearings 64 on top of the head 55 and functions to concurrently move said jaws when rocked clockwise, as clearly understandable from Fig. 9, more particularly.

Figure 16:
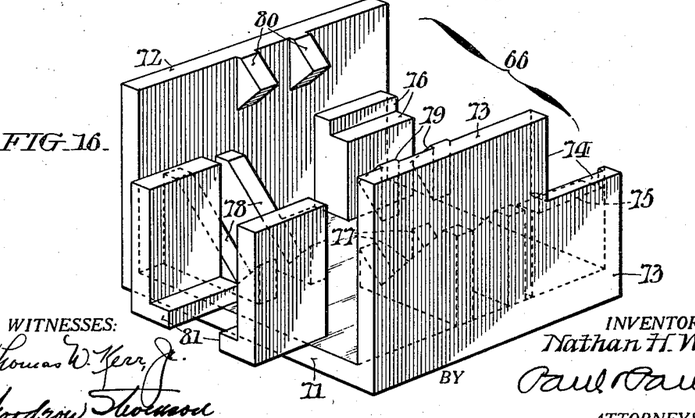
Fig. 16 is a perspective view of a preferred form of holding structure for housing the tube drawing rolls.
Figure 17:
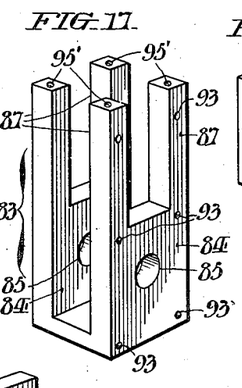
Fig. 17 is a perspective view of a lower roll bearing.
Figure 18:
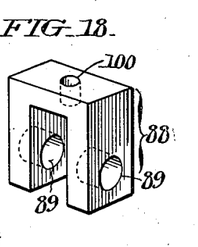
Fig. 18 is a perspective view of an upper roll bearing for coaction with that of the preceding figure.
Figure 19:
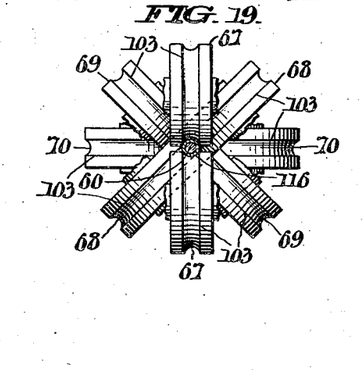
Fig. 19, Sheet 2, is an elevation showing the relative positions of four sets of tube drawing-rolls placed at forty-five degree angles.
Figure 20:
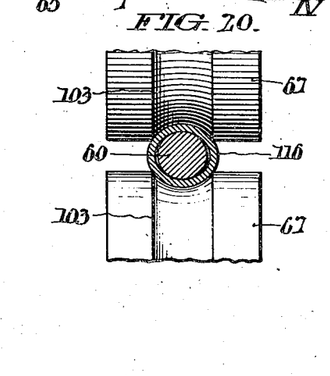
Fig. 20 is a detail view illustrative of how, under compression, a tube is diametrically expanded at right-angles to the axes of rotation of the respective coacting pairs of drawing rolls.
Figures 21, 22, 23, 24, 25:
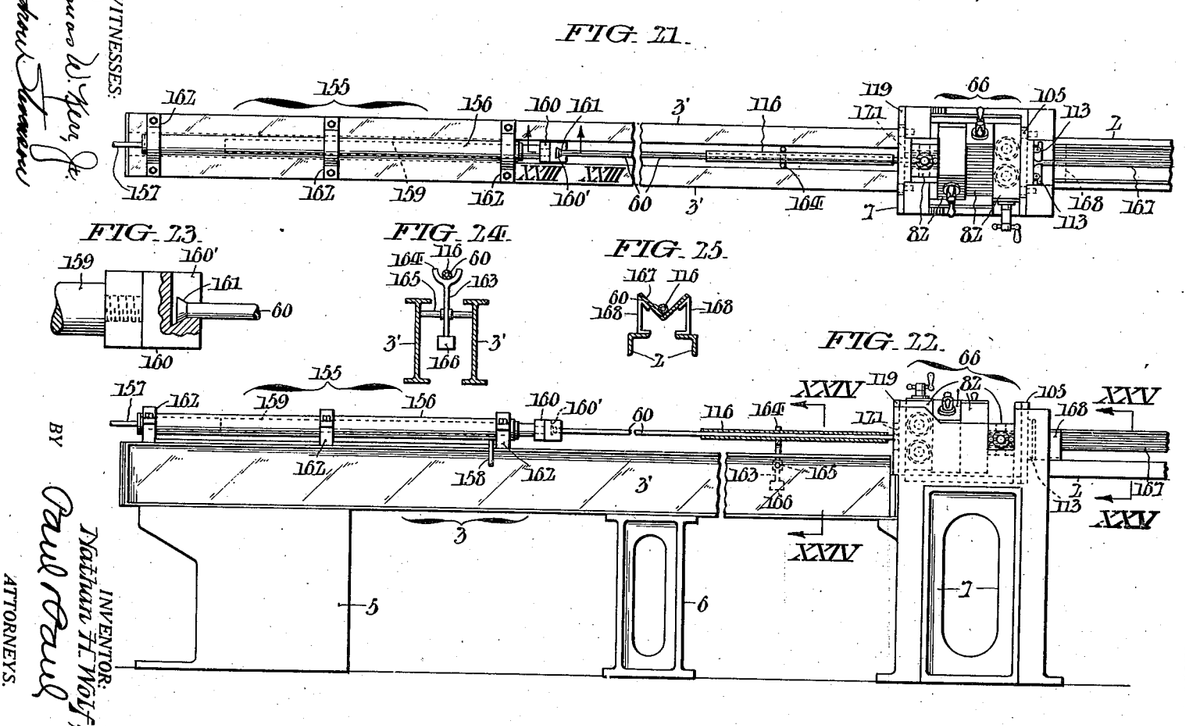
Fig. 21 is a broken plan view of a modified form of the invention, wherein the tube-forming mandrel is actuated by a hydraulic broaching-mechanism.
Fig. 22 is a broken side elevation as viewed from below Fig. 21.
Fig. 23 is a detail view, partly in section, showing how the mandrel is coupled to the broaching-mechanism push-and-pull or reciprocatory head, taken approximately as indicated by the arrows XXIII—XXIII in Fig. 21.
Fig. 24 is a vertical section on the plane XXIV—XXIV of Fig. 22.
Fig. 25 is a similar section on the plane XXV—XXV of Fig. 22.
Figure 26:
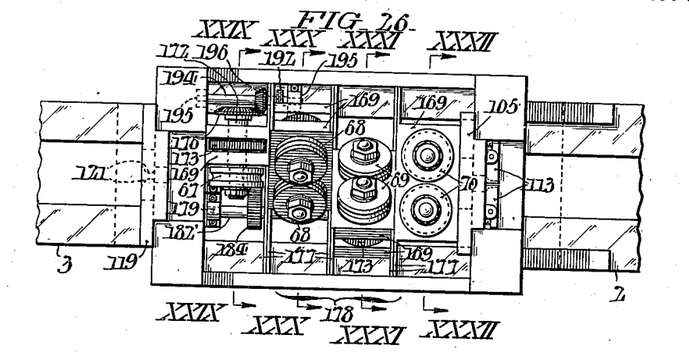
Fig. 26 is a fragmentary plan view illustrative of a further modification of the invention, wherein the tube forming rolls are power-driven in synchronized relation with the forward travel of the forming mandrel.
Figure 27:
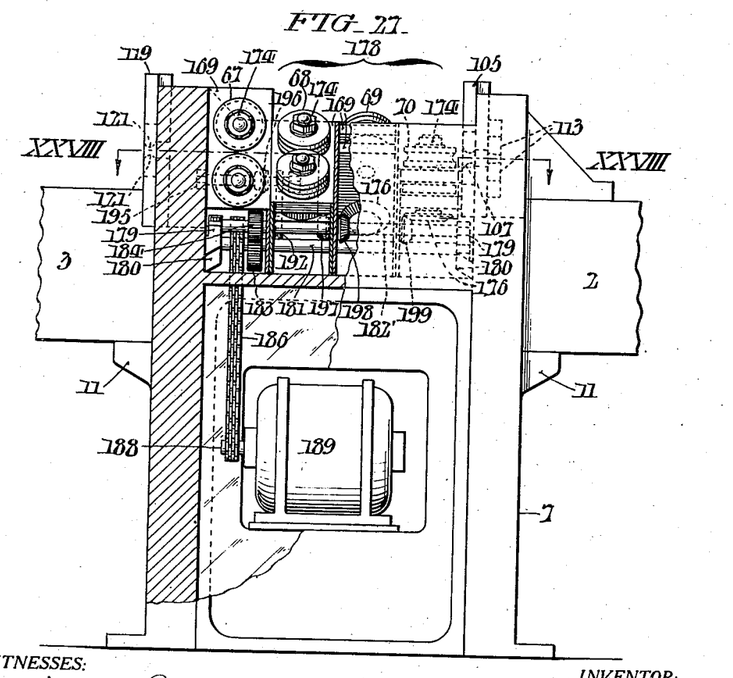
Fig. 27 is a side elevation, with parts broken out, of the preceding figure, and drawn to corresponding scale for clearer identification of like parts.
Figure 28:
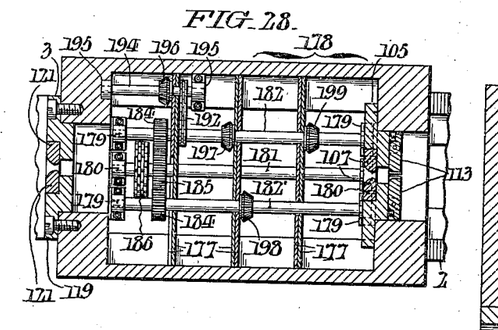
Fig. 28 is a plan section, taken as indicated by the arrows XXVIII—XXVIII in Fig. 27.
Figure 29:
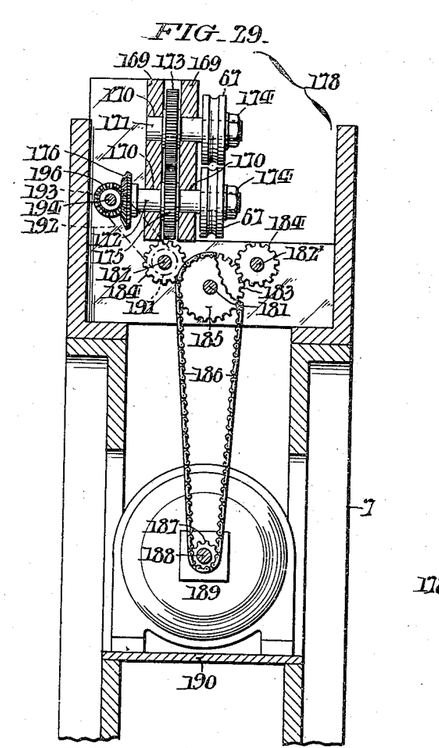
Fig. 29 is a vertical section on the plane XXIX—XXIX of Fig. 26.
Figure 30:
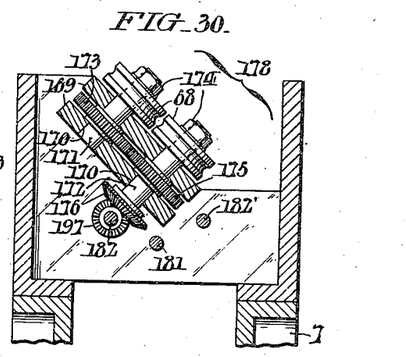
Figs. 30, 31 and 32, are fragmentary sectional views on the planes XXX—XXX, XXXI—XXXI and XXXII—XXXII, in Fig. 26, respectively.
Figure 31:
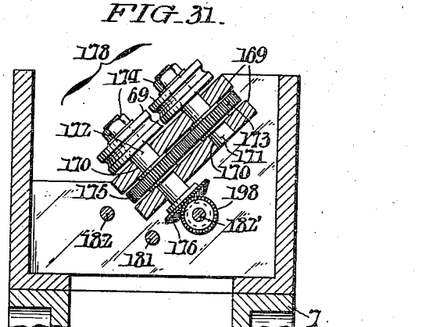
Figure 32:
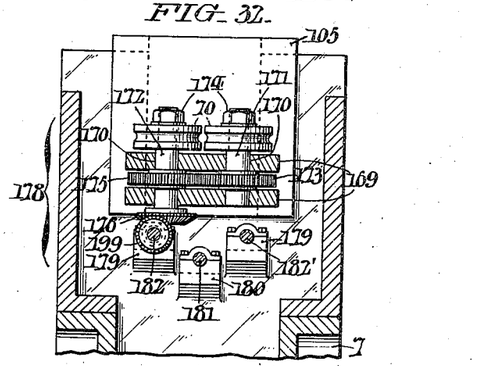

Referring now to the die head structure 7, which is preferably, although not essentially, made in one piece of hollow rectangular formation with transverse ledges 65, Fig. 3, in the upper part for seating reception of a special head 66, shown to best advantage in Fig. 16, designed to house and hold in rigid position the several sets of drawing rolls 67, 68, 69 and 70, Figs. 3 and 19. The head 66 embodies a base 71, Fig. 16, with spaced side walls 72, 73 projecting vertically with respect to said base, the wall 73 having a rectangular cut-out 74 at one upper corner with an associated inwardly-positioned stepped lug 75 therebelow, while a correspondingly located complemental lug 76 projects inwardly from the opposite wall 72. Staggeringly related chock-like spaced lugs 77, 78 with diagonally positioned rectangular lugs 79, 80 extend inwards respectively from the lower angular portions of the head 66; while spaced and opposing L-shaped lugs 81 project partially outwards from the medial end portion of the base 71. The stepped lugs 75, 76, chock-like and associated rectangular lugs 77, 78, 79 and 80, as well as the L-shaped lugs 81, respectively afford rigid support for the drawing roll bearing units comprehensively designated 82.

On reference to Figs. 4, 5, 17 and 18, and in view of the fact that all of the bearings are identical, one only will be described in detail for the sake of brevity. Each bearing unit 82 preferably comprises a hardened steel main member 83, Fig. 17, of channel section, with the spaced walls 84 having bores 85 for snug reception of a similar material axis pin 86, on which freely rotates one of a pair of drawing rolls, 69 for example; while the walls 84 have corner posts 87 in continuation thereof, and between which slidably fits a hanger or channel-section bearing 88, Fig. 18, with spaced apertures 89 for reception of an axis pin 90 on which freely rotates the companion drawing roll 69. The bearing 88 is positionally retained in adjustable engagement between the corner posts 87 of the main member 83 by plates 91 attached to the latter as by screws 92, Fig. 5, engaged in holes 93 provided for the purpose; said plates serving to prevent endwise movement of the hanger 88 and axis pins 86, 90, in an apparent manner. A cap-plate 94 is secured to the top of the corner posts 87 by screws 95 for example, engaged in correspondingly-threaded holes 95', Fig. 17, in the main bearing member posts 87, said plate having a threaded bore 96 in which is engaged an adjusting screw 97 provided with turning means 98, and having a plain extension 99 rotative in a central hole 100 through the bearing hanger 88 with a retaining washer 101 and cotter-pin 102, whereby turning of the screw 97 effects adjustment of the hanger 88 and its associated drawing roll 69 relative to the other drawing roll 69 sustained by the main member 83. Obviously the respective pairs of coactive drawing rolls 67—70 are formed with grooves 103, as shown; or they may be ball bearings of approved design with the outside race of sufficient thickness to permit forming of such grooves to the shape of the tubes to be drawn and rolled. Incidentally it is to be noted while there are shown four bearing units 82 placed at forty-five degree angles relative to each other, a greater or lesser number of such units may be used provided they are, preferably, placed at equal angles so as to ensure uniform rolling or drawing of the tube operated on.

Attached, as by counter-sunk screws 104, Figs. 3 and 4, to the inner upper wall of the die-head structure 7, is a plate 105 having a recess 106 in which the finishing die 107 is fitted, said die embodying inner and outer flares 108, 109, respectively; while said plate has a clearance aperture 110 concentric with that of the die 107. The plate 105 is also provided with vertically spaced and apertured lugs 111 for connection, by hinge pins 112, of the sectional stripper blocks or gates 113, and which are subject to the influence of socketed springs 114 coacting with the notched ends 115 of said blocks, which provides the necessary tension to close the stripper blocks as soon as the end of a drawn tube 116 is released from coaction therewith, see Fig. 15, and to hold said tube securely against further longitudinal movement while the mandrel 60 is stripped therefrom on its return movement. It is to be noted the stripper blocks 113 are taperingly flared at 117, Figs. 4, 14 and 15, to slide over the drawn tube 116 during its forward formative movement.

At the opposite end of the die-head structure 7 there is secured, as by counter-sunk screws 118, a suitable plate 119 which, in turn, is bored out at 120 to receive the initial drawing die 121, having inner and outer flares 122, 123, respectively; while said plate has a clearance orifice 124 in alignment with the axis of the die 121.

Figure 6:
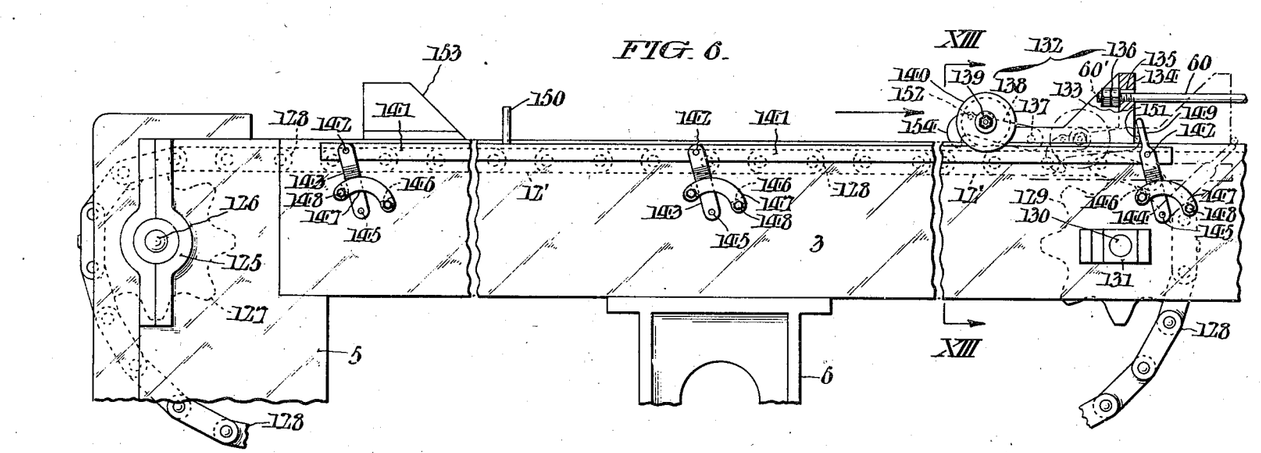
Fig. 6 is a broken side elevation showing the stripper mechanism approaching the forward limits of its movement with the tube stripping tong device in the inactive position.
Figure 7:
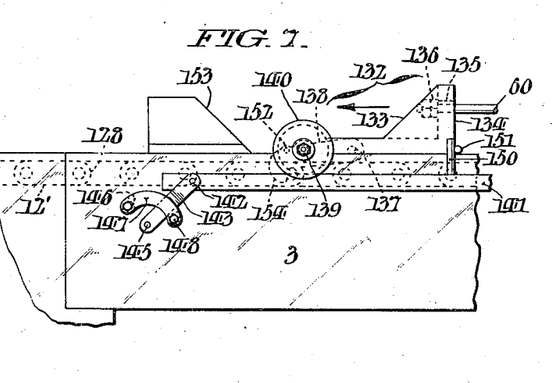
Fig. 7 is a fragmentary side view of a portion of the preceding figure, but illustrating the drawing tong device actively located in respect to the mandrel.
Figure 8:
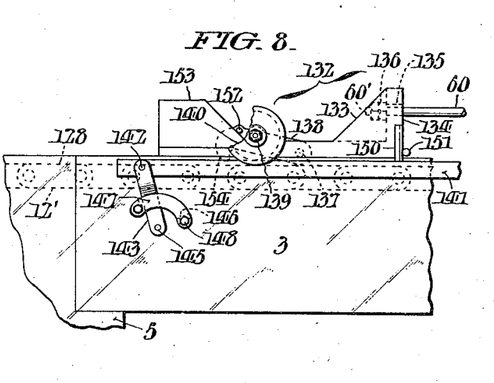
Fig. 8 is a similar view to the preceding with the parts in a different position and a minor portion broken out to better show a safety device hereinafter fully explained.
Figure 9:
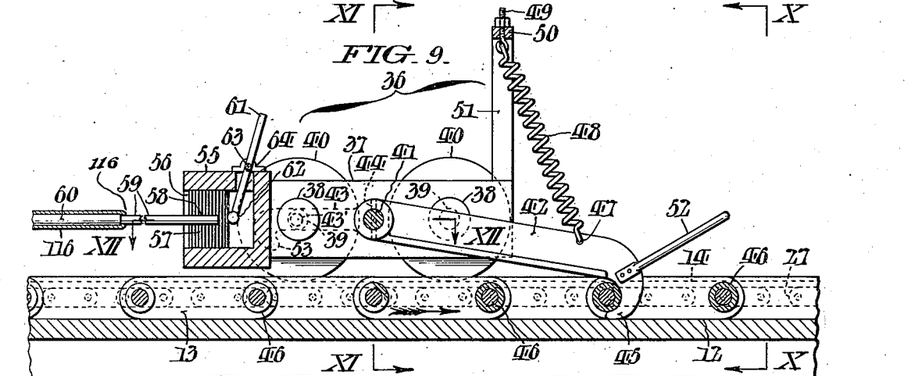
Fig. 9 is a vertical section through the drawing tong mechanism, taken approximately on the plane designated IX—IX in Fig. 1, and drawn to a larger scale for the clearer illustration of the details.
Figure 13:
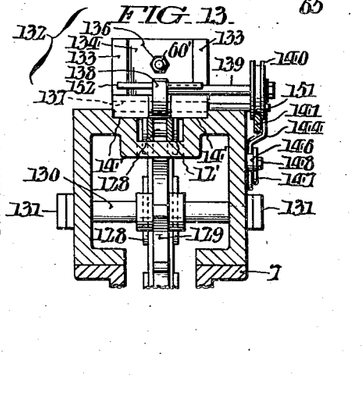
Fig. 13, Sheet 2, is a detail section on the plane XIII—XIII in Fig. 6.
Figure 14:
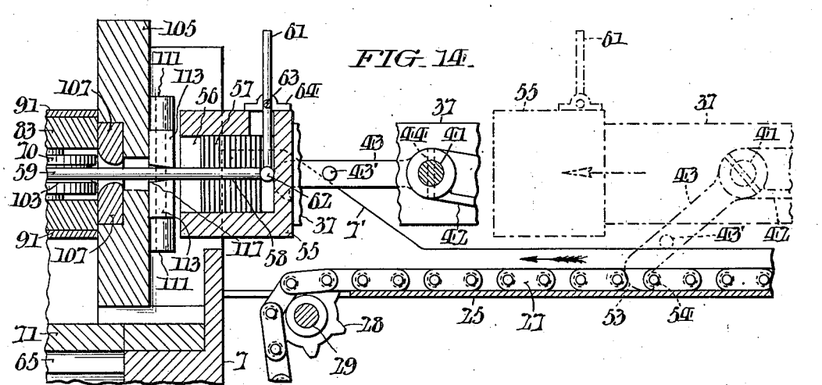
Fig. 14 is a vertical section showing the mandrel draw-head by dot-and-dash lines approaching the die head, and in full lines the position it occupies when about to grasp and advance the mandrel along its active stroke.
Figure 15:
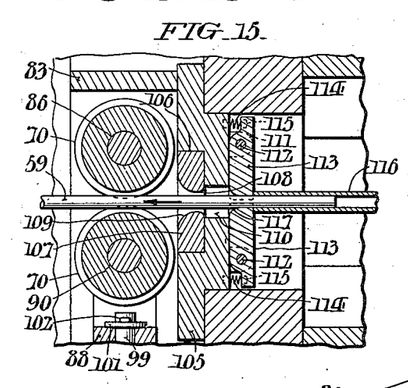
Fig. 15 is a fragmentary plan section showing how the stripper blocks coact to hold a finished tube during withdrawal of the mandrel therefrom.

Referring now to the means for operating the mandrel 60 as illustrated in Figs. 1, 2, 6–8 and 13, it will be seen that the return bench 3 is provided at the outer end with a bearing 125 for a drive shaft 126, having fast thereon a sprocket 127 about which is trained the mandrel return chain 128, the active flight whereof is guided in a longitudinal track 12', in the top of the bench 3, Figs. 6 and 13, with flanking upper tracks 14', said bench corresponding in cross-section with the draw-bench 2 hereinbefore described. The return chain 128 is also trained about an idler sprocket 129 rotative on a shaft 130 in adjustable bearings 131 for taking up any "slack" which may arise, while the return flight of said chain is guided along a channel section track 24' mounted as before set forth in connection with the draw chain 13. The drive shaft 126 is connected with a gear reducing mechanism 31', by a flexible coupling 32', driven by a suitable motor 33' operating in a reverse direction to the motor 20. Adapted for sliding progression by the chain 128 along the bench upper tracks 14' is the mandrel return drawing tong device 132, said device being somewhat in the form of an angle-block with spaced inclines 133, at the sides of a vertical wall 134. This wall 134 has a slot 135 for passage of the mandrel screw threaded end 60', which is fitted thereat with lock nuts 136 functional as a drawhead during the return movement of the mandrel 60. The tong device 132 is formed with a forked end in which is pivoted, by a pin 137, a dog 138 for coaction with the chain 128, as later on further amplified, said dog sustaining a laterally directed shaft 139 which carries a freely rotative grooved-wheel 140. This wheel 140 rides on a side rail 141, fulcrumed at 142 to stepped links 143, 144 in turn pivoted at 145 to the return bench 3, with capacity for limited angular movement between rigid stops 146 and arcuate straps 147 attached to the said bench by securing devices 148. The link 144 is preferably provided with a handle extension 149 whereby the rail 141 can be manually raised or lowered in an obvious manner; or, said rail can be automatically actuated by a vertically projecting pin 150 thereon engaging a horizontal pin 151 extending laterally from the vertical wall 134 of the tong device 132. The dog 138 is also provided with a through pin 152 for coaction with or riding-up spaced taper blocks 153, fixed on the top of the return bench 3, said pin serving as a safety means for automatically releasing the dog 138 from the return chain 128, if for any reason it should not have been so done by elevation of the rail 141; while it will be clearly understood that said rail normally functions to disengage the hook end 154 of the dog 138 from the chain 128 on forward movement of the latter when the "draw" is made and vice versa, to engage said hook with said chain on return movement of the mandrel 60 during strippage of the drawn tube 116 therefrom.

Referring now to Figs. 21-25, inclusive, which illustrate a modified form of the invention wherein the mandrel 60 is operated by a pressure actuated push-and-pull mechanism, all parts having equivalents in the preceding description are designated by like reference characters, in order to obviate unnecessary repetitive explanation. In this form of the invention, it will be remarked that the mandrel 60 is reciprocated relative to the die-head structure 7 by hydraulic means comprehensively designated 155 in Figs. 21 and 22. This means comprises a hydraulic cylinder 156 having pressure connections 157, 158, and a hollow cylinder ram or plunger 159, arranged for reciprocation in accordance with known practice, said plunger having a head 160 with a suitable recess 160' for coupler-reception of, and coaction with, the frusto-conical end 161 of the mandrel 60, whereby the latter is moved forward for the tube drawing operation and retracted during the stripping operation. The cylinder 156 is conveniently sustained on the bench 3 in bearings 162 rigidly attached thereto. In order to support the mandrel 60, with the tube 116 to be drawn, a suitable support 163 having an arcuate upper end 164 is sustained by a cross-rod 165 pivoted between the side walls 3' of the bench 3, while said support is provided with a counter-balance 166 tending to normally influence the support 163 into vertical position, but permitting said support to swing forwardly and rearwardly for passage of the plunger head 160 as it approaches and recedes from the die-head structure 7. The drawn tube 116, as it passes beyond the structure 7, is conveniently supported in an angle section guide 167, in turn sustained by rigid bearings 168, Figs. 22 and 25, mounted on the "draw" or forward bench 2. The means described, it will be noted, will be found highly advantageous and simple for drawing comparatively light gage tubes 116.

Turning now to Figs. 26-32, inclusive, which show a preferred means for power actuation of the drawing rolls 67-70, it will be observed that each bearing unit 82 for said rolls differs somewhat from the previously described structure in that it comprises complemental spaced walls 169 having apertures 170 therethrough for stub shafts 171, 172, the former of which has fast thereon a gear 173 with the hub thereof serving as a spacer for the walls 169, as well as a reduced screw-threaded extension affording rigid attachment, as by a lock nut 174, for one of the outer grooved drawing roll 67-70. On the other hand, the shaft 172 is similarly provided with a gear 175 in mesh with the gear 173, as well as having the complemental drawing roll 67-70 fixed thereon by a lock nut 174, but this shaft 172 is extended outwards and has fixed thereon a bevel gear 176, whereby said shaft is power driven, as later explained. The respective bearing units 82 are positionally held in forty-five degree relationship by appropriately shaped end partitions 177 transversely of the head structure 178, so as to ensure rigid mounting thereof. At each end of the head structure 178 and interiorly thereof, there are provided spaced upper and lower bearings 179 180, respectively; the latter of which 180 afford journal support for a drive-shaft 181, and the former similar support for paralleling counter-shafts 182, 182'. The drive-shaft 181 is operatively coordinated, by a gear 183 fast thereon, and meshing gears 184 on the counter-shafts 182, 182', and said drive-shaft has also keyed thereon a sprocket 185, about which is trained an endless chain belt 186 in turn engaging a sprocket 187 on the power shaft 188 of an electric motor 189, supported on a shelf 190 in the lower part of the structure 7. It is to be noted the drive and counter shafts 181, 182, 182' are all housed within but do not pass through the end walls of the head structure 178, while they rotatively pass through the respective partitions 177. On the counter-shaft 182 is a sprocket 191 operatively coordinated by a chain drive 192 with a sprocket 193 fast on a short shaft 194, journaled in bearings 195 provided for the purpose, in the head structure 178; and said shaft has secured thereon a bevel gear 196 in mesh with the similar gear 176 on the end of the stub-shaft 172, whereby the vertically rotating drawing rolls 67 are driven through the mechanism above described. On the other hand, the following forty-five degree angle rolls 68, 69 are directly driven by their respective bevel gears 176 meshing similar gears 197, 198 on the counter-shafts 182, 182', Figs. 30 and 31; whereas the horizontally rotating rolls 70 are similarly driven by a further bevel gear 199 on the counter-shaft 182, see Fig. 32. Thus it will be readily apparent that all of the respective drawing rolls 67-70, in this form of the die-head structure are power operated in contradistinction to being frictionally rotated by the tube 116 being drawn, as described in connection with the showings of Figs. 1-25.

Incidentally it is here remarked, and will be apparent from the typified embodiments of this invention, that in the forms illustrated by Figs. 1-20 and 21-25, the drawing of the tube 116 is effected by idler rollers 67-70; whereas with the means of Figs. 26-32, the drawing operation is effected by power-driven rolls 67-70, said means being substitutable for the die-head structure 7 in either of the first and second mentioned forms of said invention. Still further, the several motors 20, 33 and 33' are controlled by respectively associated switches 120, 133' and 133'', through conductors 200 connectable by said switches with a source of electric power, not shown; while the motor 189 of Figs. 27 and 29 will be similarly controlled from the said source of power, and the rolls 67—70 operated thereby synchronized with the moving speed of the mandrel 60. Particular attention is also directed to the provision of the mandrel 60, with a shank 59 of sufficient length for initial passage through the drawing die 121, rolls 67—70, the finishing die 107 and the automatically opening-and-closing stripper gates 113 for grippage by the drawing tong device 36, or push-and-pull connection to the plunger head 160 before actual drawing of the tube 116 commences. It is also noteworthy that the respective rolls 67—70 expand the tube 116 on the mandrel 60, in a direction at right angles to that of their compressive effect, just sufficient to permit easy releasing of said mandrel during the stripping operation and also without any scoring of the tube.

The operation of the tube drawing machine may be briefly described as follows. Assuming that a tube 116 to be drawn has previously had one end headed in and prepared for drawing, is placed on a mandrel 60 of the desired diameter, or one conformable with the inside bore of the tube, with such headed-in end 116'—Fig. 9— engaging the mandrel shoulder defined by the shank 59, said shank is entered through the drawing die 121 as aforesaid, rolls 67—70, finishing die 107 and stripper gates 113 until its leading end engages the pivoted lever 61, Fig. 14, or with the end of said shank between the stripper gates 113. The drawing tong device 36 is next moved toward the end head 4 of the bench 2 and by gripping the mandrel shank 59 moves the mandrel 60 forward under pull of the chain 13. As the tube 116 is drawn through the rolls 67—70, it is varyingly and progressively worked and reduced until it passes through the finishing die 107 and stripper gates 113, which latter remain open until the terminal end of said tube has moved past said gates. As the tube 116 passes beyond the compressive influence of the last rolls 70, and the grip of the finishing die 107, the tong device 36 moves forward at a speed in excess of that of the chain 13 due to its sudden release from "pull" thereby. This sudden release or "jump" frees the hook end 45 of the dog 22 from engagement with the chain 13, whereupon the spring 48 reacts and snaps the dog 43 into position for engagement with the return chain 27.

In other words, upon release of the end of the mandrel shank 59 from forward pull by the head 55 and dog 42, the latter having been disengaged from the draw chain 13, as previously explained, the tong device 36 will come to a definite stop. On the other hand, the tong device 132 having tripped the stepped link 144, under the pull of the mandrel 60, and shifted to the dot-and-dash line position at the right-hand of Fig. 6, will commence to move in the reverse direction as similarly indicated in Fig. 14, and thereby strip the finished pipe 116 from said mandrel, under closure of the gates 113 and pull of the return chain 128. As the pin 152 reaches and ascends the taper blocks 153, Fig. 8, the dog 138 becomes released from the chain 128, thereby stopping the tong device 132 from further return movement. The full return of the tong device 132 draws the mandrel shank 59 from between the series of drawing rolls 67—70, and the initial working reducing die 121, as well as out of the die-head structure 7, whereupon the finished tube 116 is removed from the machine in accordance with known practice. Incident to full retraction of the mandrel 60 as aforesaid, it can be manually or otherwise swung outward or upward, for application thereto of the next tube to be drawn, by oscillation of said mandrel about its end 60' in the drawing-tong slot 135. After the new tube to be drawn has been applied, the tong device 132, together with the mandrel 60 is moved forward by the operator until the mandrel shank 59 passes through and beyond the finishing die 107 and its free end engages the pivotal lever 61 and rocks the latter into vertical abutment against the forward wall of the hollow head 55. The dog 43 having been placed in position for coaction with the return-chain 27 under action of the spring 48, said chain will return the tong device 36 to its position for commencing the next tube-drawing operation, upon the operator closing the switch 133" to start the motor 33. When the mandrel 60 reaches the gripper jaws 57 and opens the latter, as before set forth, the dog 43 is disengaged from the return-chain 27 and the tong device 36 stops momentarily with the mandrel 60 between said jaws, whereupon the operator swings the lever 61 counterclockwise to free the jaws 57 for snap grippage about the mandrel 60, whereupon the tong device 36 moves forward under the pull of the dog 42 and tube drawing chain 13 for drawing the second mentioned or succeeding tube operated on. The return-chain 27 is stopped by the operator opening the switch 133" as the second mentioned tube 116 enters the initial drawing die 121 for working reduction of its external diameter.

Concurrent with the "jump" hereinbefore referred to as caused by freeing of the dog 42, the grip of the jaws 57 on the mandrel shank 51 is released; while the pin 152 will move the handled link 144 from the full line position shown in Fig. 6 to the dot-and-dash location in the same figure, thus allowing the hook end 154 of the dog 138 to engage the mandrel-return chain 128, whereby the drawing tong device 132 is returned to its starting position as hereinbefore explained, whereupon the stripper gates 113 close under recoil action of the springs 114. The drawing pull is now "off" the tong device 36, whereupon the said device is moved in the reverse direction under pull of the return chain 27, while the gates 113 being closed effect concurrent strippage of the tube 116 from the mandrel 60, in the manner obvious from the preceding description, whereupon said mandrel is now ready for application of the next tube to be drawn.

From the foregoing it is thought the merits and advantages of the subject-matter involved herein will be fully appreciated by those conversant with the art and, while preferred embodiments have been illustrated and described, many changes may be made without departing from the spirit of the invention. Accordingly, it is desired to include all such changes as reasonably come within the scope of the following claims.

Having thus described my invention, I claim:

1. In a machine for drawing tube the combination of axially aligned draw and return benches with an intervening die-head assembly for compressively-reducing the cross-sectional area of the tube, said assembly including a reducing die, aligned equi-angularly related pairs of compressor rolls for varyingly and progressively reducing the tube, said rolls also serving to free the tube from the mandrel by spreading action intermediate their points of active contact with such tube, and a finishing die with an associated stripper means in advance of the compressor rolls; a mandrel adapted to the bore of the tube and having a reduced end extension which is of a linear dimension exceeding the over-all length of the die-head assembly; a tong device movable along the draw bench with means for gripping the mandrel extension outer end; individual power-actuated progressing mechanisms on the draw bench for, respectively, drawing the mandrel and a sustained tube through the die-head structure and for returning said tong device to its initial position after the finished tube is removed from the mandrel; a second tong device movable along the return bench and connectable to the mandrel end; progressing mechanism on the return bench for the last mentioned tong device to effect stripping the mandrel from the finished tube during the return stroke of said mandrel; and power operated means for actuating the respective progressing mechanisms in cyclic relation during each complete operation of the machine.

2. The combination of claim 1, further characterized by a counterweighted normally vertical supporting member pivotally mounted in the rear bench intermediate the pressure actuator means and the die head structure, said member embodying an arcuate upper end for axial support of the mandrel and tube in alignment with the axis of the pressure actuator reciprocatory plunger during the drawing operation, and said member also, by swinging movement in the plane of the mandrel axis, accommodating free passage of the plunger head forwardly and rearwardly thereover.

3. The combination of claim 1, further characterized by an angle section guide in advance of the die head structure for aligned support of the mandrel and finished tube as it emerges from said head structure, and also serving for similar support of the tube during its strippage from the mandrel.

4. The combination of claim 1, wherein the equi-angularly-related compressor rolls are all operatively-coordinated, and power actuated mechanism operates said rolls in conformity with the progressive speed of the mandrel.

5. The combination of claim 1, wherein the die-head assembly comprises a base with spaced vertical walls, one of said walls having a cut-out at one upper corner, opposing inner stepped lugs associated with said cut-out, staggeringly related chock-like lugs with diagonally opposing L-section lugs, and spaced opposing angular lugs project outwards from the medial end part of the base remote from the cut-out aforesaid; and said chock-like, angular lugs, as well as the L-section and stepped lugs with the cut-out, respectively afford rigid support for the compressor roll units in equi-angular relation.

6. The combination of claim 1, wherein each compressor roll unit comprises a channel-section member with paralleling corner-posts projecting beyond the section flange portions, axially aligned bores through said flange portion for reception of an axis pin, a channel-section hanger bearing slidably fits between the corner posts aforesaid with a second axis pin sustained thereby in parallel with the first mentioned axis pin, compressor rolls are freely rotative on the respective axis pins, means whereby said pins are restrained against axial movement, and means whereby the hanger bearing is adjustable relative to the channel-section member for varying the degree of compression exertable by the coacting compressor rolls.

7. The combination of claim 1, wherein each compressor roll unit comprises a channel-section member with paralleling corner-posts projecting beyond the section flange portions, axially aligned bores through said flange portion for reception of an axis pin, a channel-section hanger bearing slidably fits between the corner posts aforesaid with a second axis pin sustained thereby in parallel with the first mentioned axis pin, compressor rolls are freely rotative on the respective axis pins, plate members attached to the channel-section flange and post outer walls restrain the axis pins and hanger bearing against endwise movement, a cap plate is secured on the free ends of the corner posts with an adjuster screw axially therethrough; and said screw includes a plain extension rotatively coupled to the hanger bearing for adjustment of the latter relative to the channel-section member.

8. The combination of claim 1, wherein the die head assembly includes an inset initial drawing die with inner and outer flares, a similarly inset finishing die likewise having inner and outer flares, and opposing spring influenced stripper gates are associated with the finishing die, said gates having outwardly-converging flares in direct alignment with the respective die axes.

9. The combination of claim 4, wherein meshing gears on miter geared shafts coordinate the several compression rolls for rotation in unison, and a power actuator is operatively connected to one of said shafts.

NATHAN H. WOLF.